(12) United States Patent
Sakariya et al.

(10) Patent No.: US 8,508,538 B2
(45) Date of Patent: Aug. 13, 2013

(54) TIMING CONTROLLER CAPABLE OF SWITCHING BETWEEN GRAPHICS PROCESSING UNITS

(75) Inventors: Kapil V. Sakariya, Sunnyvale, CA (US); Michael F. Culbert, Monte Sereno, CA (US); Michael Nugent, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 1232 days.

(21) Appl. No.: 12/347,312

(22) Filed: Dec. 31, 2008

(65) Prior Publication Data

US 2010/0164962 A1 Jul. 1, 2010

(51) Int. Cl.
*G06F 15/16* (2006.01)
(52) U.S. Cl.
USPC .............................. 345/502; 345/505; 345/530
(58) Field of Classification Search
USPC .................................. 345/501–505; 713/320
See application file for complete search history.

(56) References Cited

U.S. PATENT DOCUMENTS

| | | | |
|---|---|---|---|
| 4,102,491 A | 7/1978 | DeVito et al. | |
| 5,341,470 A | 8/1994 | Simpson et al. | |
| 5,963,200 A | 10/1999 | Deering et al. | |
| 6,385,208 B1 | 5/2002 | Findlater et al. | |
| 6,535,208 B1 * | 3/2003 | Saltchev et al. | 345/213 |
| 6,557,065 B1 * | 4/2003 | Peleg et al. | 710/300 |
| 6,624,816 B1 | 9/2003 | Jones, Jr. | |
| 6,624,817 B1 | 9/2003 | Langendorf | |
| 6,738,068 B2 | 5/2004 | Satchit et al. | |
| 6,738,856 B1 | 5/2004 | Milley et al. | |
| 6,943,667 B1 | 9/2005 | Kammer et al. | |
| 7,039,734 B2 | 5/2006 | Sun et al. | |
| 7,039,737 B1 | 5/2006 | Dorr et al. | |
| 7,119,808 B2 * | 10/2006 | Gonzalez et al. | 345/502 |
| 7,127,521 B2 | 10/2006 | Hsu et al. | |
| 7,309,287 B2 | 12/2007 | Miyamoto et al. | |
| 7,372,465 B1 | 5/2008 | Tamasi et al. | |
| 7,382,333 B2 | 6/2008 | Chen et al. | |
| 7,506,188 B2 | 3/2009 | Krantz et al. | |
| 7,849,246 B2 | 12/2010 | Konishi et al. | |
| 7,865,744 B2 | 1/2011 | Lee et al. | |

(Continued)

FOREIGN PATENT DOCUMENTS

| | | |
|---|---|---|
| EP | 0272655 | 6/1988 |
| EP | 1158484 | 11/2001 |

(Continued)

OTHER PUBLICATIONS

Author Unknown, "Serial-MII Specification," Cisco Systems, Inc., Revision 2.1, pp. 1-7, Feb. 9, 2000.

(Continued)

*Primary Examiner* — Said Broome
*Assistant Examiner* — Peter Hoang
(74) *Attorney, Agent, or Firm* — Meyertons, Hood, Kivlin, Kowert & Goetzel, P.C.

(57) ABSTRACT

A display system is disclosed that is capable of switching between graphics processing units (GPUs). Some embodiments may include a display system, including a display, a timing controller (T-CON) coupled to the display, the T-CON including a plurality of receivers, and a plurality of GPUs, where each GPU is coupled to at least one of the plurality of receivers, and where the T-CON selectively couples only one of the plurality of GPUs to the display at a time.

18 Claims, 5 Drawing Sheets

(56) References Cited

U.S. PATENT DOCUMENTS

| | | |
|---|---|---|
| 7,882,282 B2 | 2/2011 | Haban et al. |
| 7,898,994 B2 | 3/2011 | Zhao et al. |
| 2003/0226050 A1 | 12/2003 | Yik et al. |
| 2005/0030306 A1 | 2/2005 | Lan et al. |
| 2005/0099431 A1 | 5/2005 | Herbert et al. |
| 2005/0231498 A1 | 10/2005 | Abe et al. |
| 2006/0017847 A1 | 1/2006 | Tardif |
| 2007/0283175 A1* | 12/2007 | Marinkovic et al. .......... 713/320 |
| 2007/0285428 A1 | 12/2007 | Foster et al. |
| 2008/0030509 A1 | 2/2008 | Conroy et al. |
| 2008/0117217 A1 | 5/2008 | Bakalash et al. |
| 2008/0168285 A1 | 7/2008 | de Cesare et al. |
| 2009/0153528 A1 | 6/2009 | Orr |
| 2010/0083023 A1 | 4/2010 | Bjegovic et al. |
| 2010/0083026 A1 | 4/2010 | Millet et al. |
| 2010/0091039 A1 | 4/2010 | Marcu et al. |
| 2010/0103147 A1 | 4/2010 | Sumpter |
| 2010/0164963 A1 | 7/2010 | Sakariya |
| 2010/0164964 A1 | 7/2010 | Sakariya et al. |
| 2010/0164966 A1 | 7/2010 | Sakariya |
| 2011/0032275 A1 | 2/2011 | Marcu et al. |

FOREIGN PATENT DOCUMENTS

| | | |
|---|---|---|
| EP | 1962265 | 8/2008 |
| JP | 06006733 | 1/1994 |
| WO | 2005059880 | 6/2005 |
| WO | WO2008/016424 | 2/2008 |

OTHER PUBLICATIONS

International Search Report, PCT Application No. PCT/US2009/069851, 6 pages, Aug. 9, 2010.

* cited by examiner

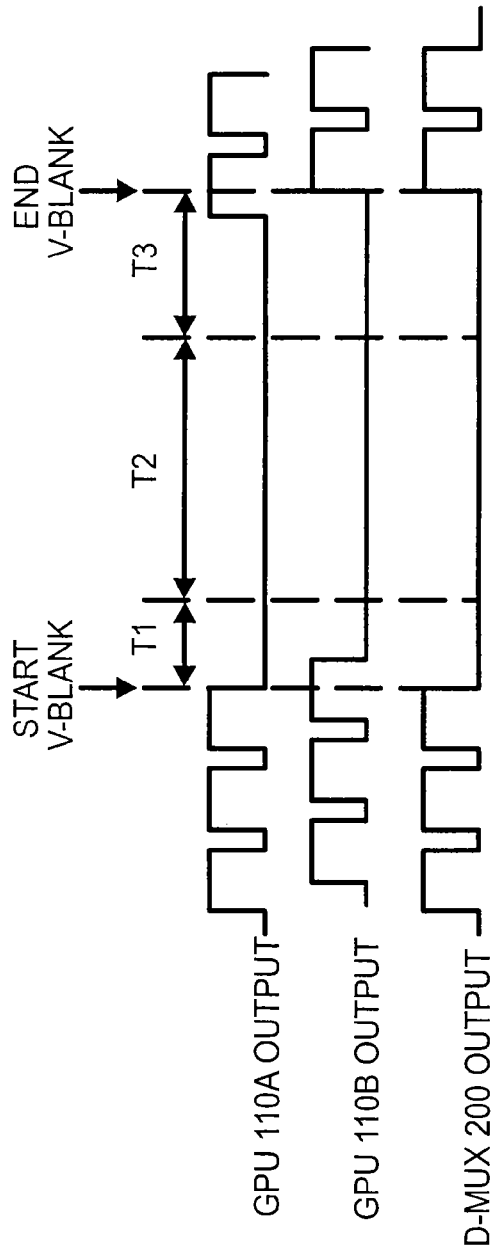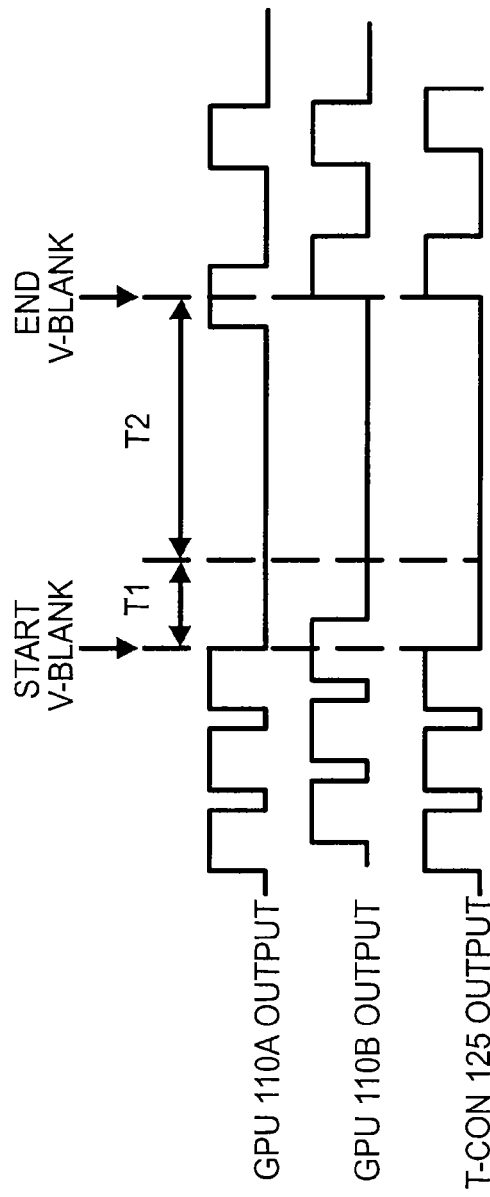

TIMING CONTROLLER CAPABLE OF SWITCHING BETWEEN GRAPHICS PROCESSING UNITS

RELATED APPLICATIONS

This application is related to, and incorporates by reference, the following applications: "Improved Switch for Graphics Processing Units," filed on the same date as this application and identified as Ser. No. 12/347,364; "Display System With Improved Graphics Abilities While Switching Graphics Processing Units," filed on the same date as this application and identified as Ser. No. 12/347,413; and "Improved Timing Controller for Graphics System" filed on the same date as this application and identified as Ser. No. 12/347,491.

BACKGROUND OF THE INVENTION

1. Technical Field

The present invention relates generally to graphics processing units (GPUs) of electronic devices, and more particularly to switching between multiple GPUs during operation of the electronic devices.

2. Background

Electronic devices are ubiquitous in society and can be found in everything from wristwatches to computers. The complexity and sophistication of these electronic devices usually increase with each generation, and as a result, newer electronic devices often include greater graphics capabilities their predecessors. For example, electronic devices may include multiple GPUs instead of a single GPU, where each of the multiple GPUs may have different graphics capabilities. In this manner, graphics operations may be shared between these multiple GPUs.

Often in a multiple GPU environment, it may become necessary to swap control of a display device among the multiple GPUs for various reasons. For example, the GPUs that have greater graphics capabilities may consume greater power than the GPUs that have lesser graphics capabilities. Additionally, since newer generations of electronic devices are more portable, they often have limited battery lives. Thus, in order to prolong battery life, it is often desirable to swap between the high-power GPUs and the lower-power GPUs during operation in an attempt to strike a balance between complex graphics abilities and saving power.

Regardless of the motivation for swapping GPUs, swapping GPUs during operation may cause defects in the image quality, such as image glitches. For example, conventional approaches may include fading out a display that is being driven by the current GPU, decoupling the current GPU's output signal from the display, and coupling the new GPU's output signal to the display.

Some conventional approaches may overcome introducing visual defects in the image quality. For example, some conventional approaches implement a digital multiplexer to switch among a plurality of GPUs. Unfortunately, this may increase the performance requirements, power usage, and cost of the display system.

Accordingly, methods and apparatuses that more efficiently switch between GPUs are needed.

SUMMARY

A display system is disclosed that is capable of switching between graphics processing units (GPUs). Some embodiments may include a display system, including a display, a timing controller (T-CON) coupled to the display, the T-CON including a plurality of receivers, and a plurality of GPUs, where each GPU is coupled to at least one of the plurality of receivers, and where the T-CON selectively couples only one of the plurality of GPUs to the display at a time.

Other embodiments may include a method for switching between GPUs in a display system, the method including updating a display from a first GPU, determining if the first GPU has entered a blanking interval, in the event that the first GPU has entered a blanking interval, determining if another component within the display system has requested a GPU switch, in the event that the another component within the display system has requested a GPU switch, switching to a second GPU, where the switching to the second GPU occurs without determining a timing signal of a video signal from the second GPU.

Other embodiments may include a T-CON, including a plurality of receivers, where each receiver comprises a PLL and the T-CON selectively couples to only one of a plurality of GPUs at a time.

BRIEF DESCRIPTION OF THE DRAWINGS

FIG. 2B illustrates an exemplary timing diagram of signals according to a conventional GPU switching approach using a separate digital multiplexer.

FIG. 3 illustrates an exemplary timing diagram of signals according to one embodiment that does not use a separate digital multiplexer.

The use of the same reference numerals in different drawings indicates similar or identical items.

DETAILED DESCRIPTION OF THE INVENTION

The following discussion describes various embodiments that allow greater flexibility in switching between GPUs during operation of a display system without introducing visual artifacts into the image being displayed. Some embodiments may implement a timing controller that switches between GPUs without a separate multiplexer. In this manner, a separate multiplexer chip may be eliminated from the system, thereby reducing chip area, power consumption, and cost. Also, implementing a timing controller that switches between GPUs without a separate multiplexer may lessen the amount of time that a GPU switch takes.

Although one or more of these embodiments may be described in detail in the context of a computer graphics system, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

Figure 1:
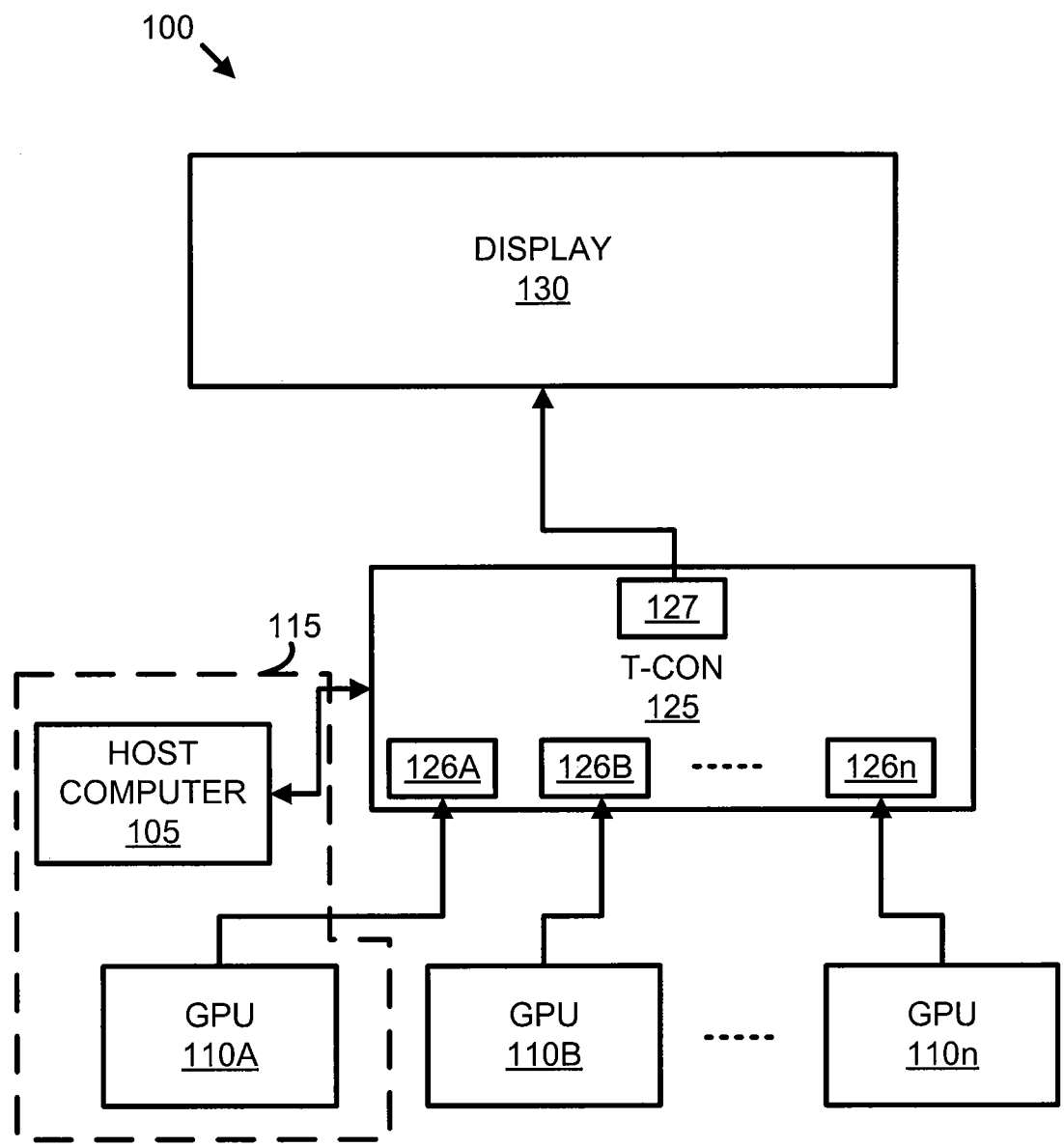
FIG. 1 illustrates an exemplary approach to switching between GPUs without using a separate digital multiplexer.

FIG. 1 illustrates one example of a display system 100 capable of switching between a plurality of GPUs without implementing a separate digital multiplexer. Prior to delving into the specifics of FIG. 1, it should be noted that the components listed in FIG. 1, and referred to below, are merely examples of one possible implementation. Other components, buses, and/or protocols may be used in other implementations without departing from the spirit and scope of the detailed description. Also, although one or more components of the display system 100 are represented using separate blocks, it should be appreciated that one or more of the components of the display system 100 may be part of the same integrated circuit.

Referring now to FIG. 1, the display system 100 may include a host computer system 105. In some embodiments, the host computer 105 may be a laptop computer operating on battery power. In other embodiments, the host computer 105 may be a desktop computer, enterprise server, or networked computer device that operates off of wall power. During operation, the host computer 105 may communicate control signals and other communication signals to various devices within the system.

The display system also may include multiple GPUs 110A-110n. These GPUs 110A-110n may exist within the computer system 100 in a variety of forms and configurations. In some embodiments, the GPU 110A may be implemented as part of another component within the system 100. For example, the GPU 110A may be part of a chipset in the host computer 105 (as indicated by the dashed line 115) while the other GPUs 110B-110n may be external to the chipset. The chipset may include any variety of integrated circuits, such as a set of integrated circuits responsible for establishing a communication link between the GPUs 110-A-110n and the host computer 105, such a Northbridge chipset.

The GPUs 110A-110n may be further coupled to a timing controller (T-CON) 125 via plurality of receivers 126A-126n. During operation, the receivers 126A-126n within the T-CON 125 may receive video image and frame data from various components in the system. As the T-CON 125 receives these signals, it may process them and send them out (via a transmitter 127) in a format that is compatible with a display 130 coupled to the T-CON 125. The display 130 may be any variety including liquid crystal displays (LCDs), plasma displays, cathode ray tubes (CRTs) or the like. Likewise, the format of the video data communicated from the T-CON 125 to the display 130 may include a wide variety of formats, such as display port (DP), low voltage differential signaling (LVDS), etc.

During operation of the video system 100, the GPUs 110A-110n may generate video image data along with frame and line synchronization signals. For example, the frame synchronization signals may include a vertical blanking interval (VBI) in between successive frames of video data. Further, the line synchronization signals may include a horizontal blanking interval (HBI) in between successive lines of video data. Data generated by the GPUs 110A-110n may be communicated to the T-CON 125.

When the T-CON 125 receives these signals, it may process them and send them out in a format that is compatible with a display 130 coupled to the T-CON 125, such as DP, LVDS, etc. In some embodiments, this processing may include determining where the VBI and/or HBI occurs.

Referring still to FIG. 1, the GPUs 110A-110n may have different operational capabilities. For example, as mentioned above, the GPU 110A may be integrated within another device in the display system 100, such as a CPU in the host computer 105, and as such, the GPU 110A may not be as graphically capable as the GPU 110B, which may be a stand alone discrete integrated circuit. In addition to having different operational capabilities, the GPUs 110A-110n may consume different amounts of power. Because of this, it may be necessary to balance the desire to use the GPU 110B (i.e., have more graphical capabilities) with the desire to use the GPU 110A (i.e., consume less power) by switching among the GPUs 110A-110n.

Figure 2A:
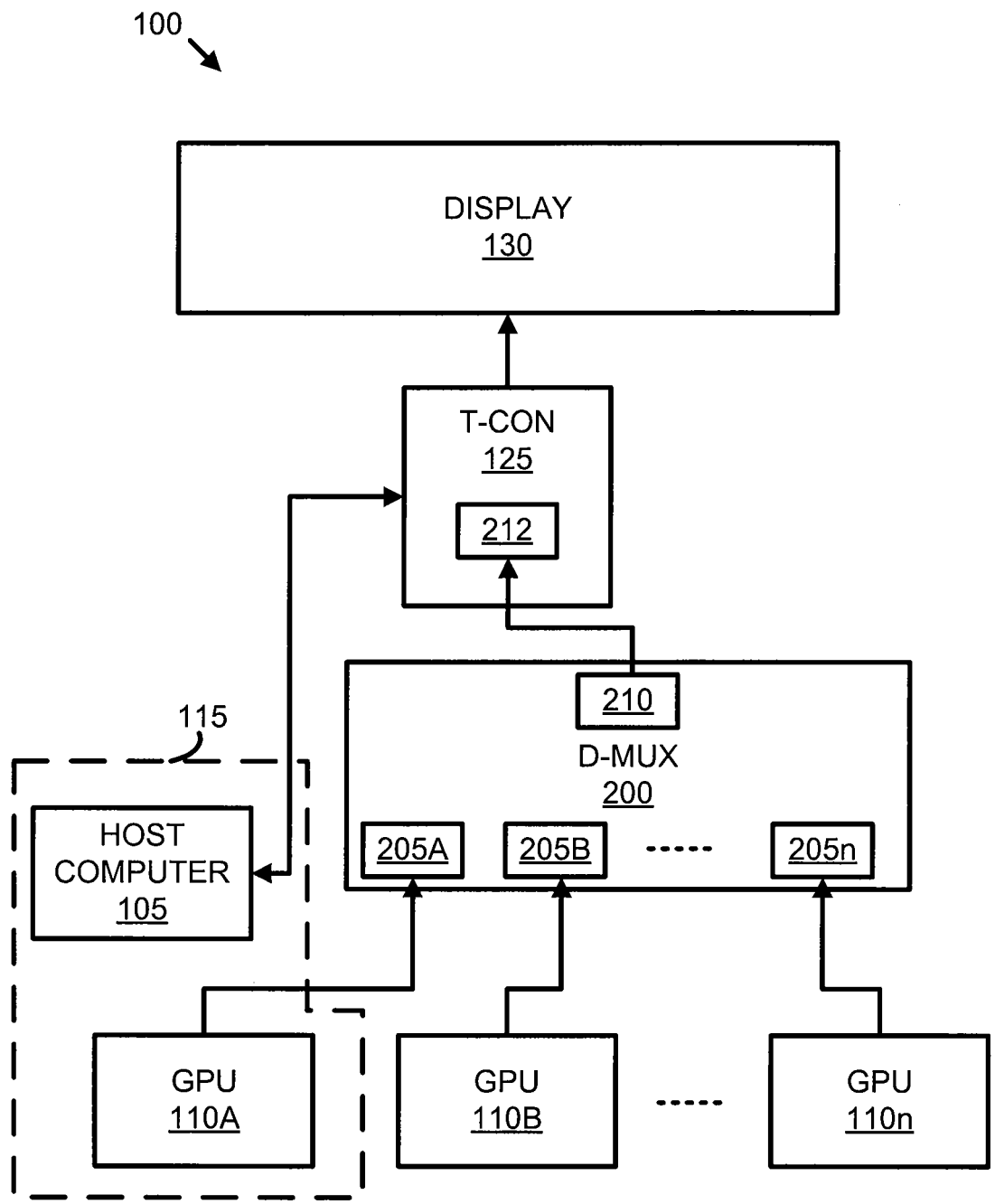
FIG. 2A illustrates a conventional GPU switching approach using a separate digital multiplexer.

In order to perform switching between the GPUs 110A-110n without introducing visual artifacts such as glitches or screen tearing, the switching between the GPUs 110A-110n should occur during either the VBI and/or during the HBI. FIG. 2A illustrates a conventional switching configuration. As shown, conventional switching configurations often employ a digital multiplexer (D-MUX) 200 that includes a plurality of receivers 205A-205n, each coupled to the GPUs 110A-110n, and a transmitter 210 coupled to a receiver 212 within the T-CON 125. During operation, the D-MUX 200 decodes the video data received via the receivers 205A-205n to determine if a switching window exists. In some embodiments, the switching window may be coincident with the location of the VBI or HBI within the video data in both the current and new GPUs. For example, the switching window may occur when there is an overlap of blanking (e.g., VBI or HBI) of the current GPU and blanking (e.g., VBI or HBI) of the new GPU. In other embodiments, the switching window may occur when the current GPU enters VBI or HBI and the new GPU has yet to enter VBI or HBI. After the D-MUX 200 has determined the location of the switching window, the D-MUX 200 switches between the GPUs 110A-110n during this time and re-encodes the video data before sending it along to the T-CON 125. However such conventional approaches often increase performance requirements, power usage, and cost of the system 100. For example, each time the D-MUX 200 switches between signals, the T-CON 125 has to lock to a timing signal within each signal, which makes the GPU switch take longer to occur.

FIG. 2B illustrates GPU switching during blanking using conventional techniques. As shown, the GPU 110A and the GPU 110B may output signals that have slightly different frequencies. For example, the relative frequencies of the GPUs 110A and 110B may have a 1% difference in frequency that causes the two waveforms to shift relative to each other. In this manner, the blanking periods of each of the signals may overlap from time to time. When the blanking periods overlap, the D-MUX 200 may switch between the GPUs 110A and 110B. FIG. 2B illustrates the various time components T1, T2, and T3 associated with the GPU switch.

The time T1 corresponds to a time period between when the GPU 110A enters vertical blanking and prior to a time that the D-MUX 200 is capable of switching. In some embodiments, the time T1 may range between zero seconds and the time it takes to paint three scan lines to the display 130. The time T2 corresponds to a time associated with a switching window for the D-MUX 200. In some embodiments, such as those that implement LVDS, the time T2 may be four LVDS clock cycles. The time T3 corresponds to a time when a phase locked loop (PLL) within the receiver 212 locks onto a timing signal in the new signal coming from GPU 110B. As can be appreciated from inspection of the waveforms shown in FIG. 2B, the time T3 ends when the new GPU 110B ends its blanking period.

Some embodiments, however, may improve the system performance, power usage, and cost by switching between the GPUs without the use of the D-MUX 200. For example, as shown in the embodiment of FIG. 1, the T-CON 125 may be directly coupled to the GPUs 110A-110n. Since the T-CON 125 may already know where the blanking interval occurs for both the current GPU and the new GPU, the T-CON 125 may determine where to switch without the decoding of the D-MUX 200 by integrating the receivers 205A-205n into the T-CON 125 (shown as 126A-126n in FIG. 1). This may provide several advantages over conventional approaches. First, the D-MUX 200, as well as, the transmitter 210 and the receiver 212 may be eliminated from the system 100 entirely, which may reduce overall system cost, power usage, and chip area. Second, because the T-CON 125 may have simultaneous access to both the current and the new GPU data prior to performing the switch, the T-CON 125 may not need to re-lock to the timing signal of the new GPU each time the T-CON 125 switches between GPUs, and therefore, the time taken to switch between GPUs may be less than in the approaches that implement a separate multiplexer.

FIG. 3 illustrates GPU switching without a separate multiplexer (per the embodiment of FIG. 1). Referring to FIG. 3 in conjunction with FIG. 1, because each of the receivers 126A-126n may be separately coupled to a respective GPU 110A-110n, as the T-CON 125 selects among the various GPUs 110A-110n, the T-CON 125 already may be synchronized with the timing signal of each signal. Thus, the time period T3 associated with re-locking the PLL to the new GPU (per FIGS. 2A and 2B) may be eliminated, thereby decreasing the time taken to switch between GPUs.

Figure 4:
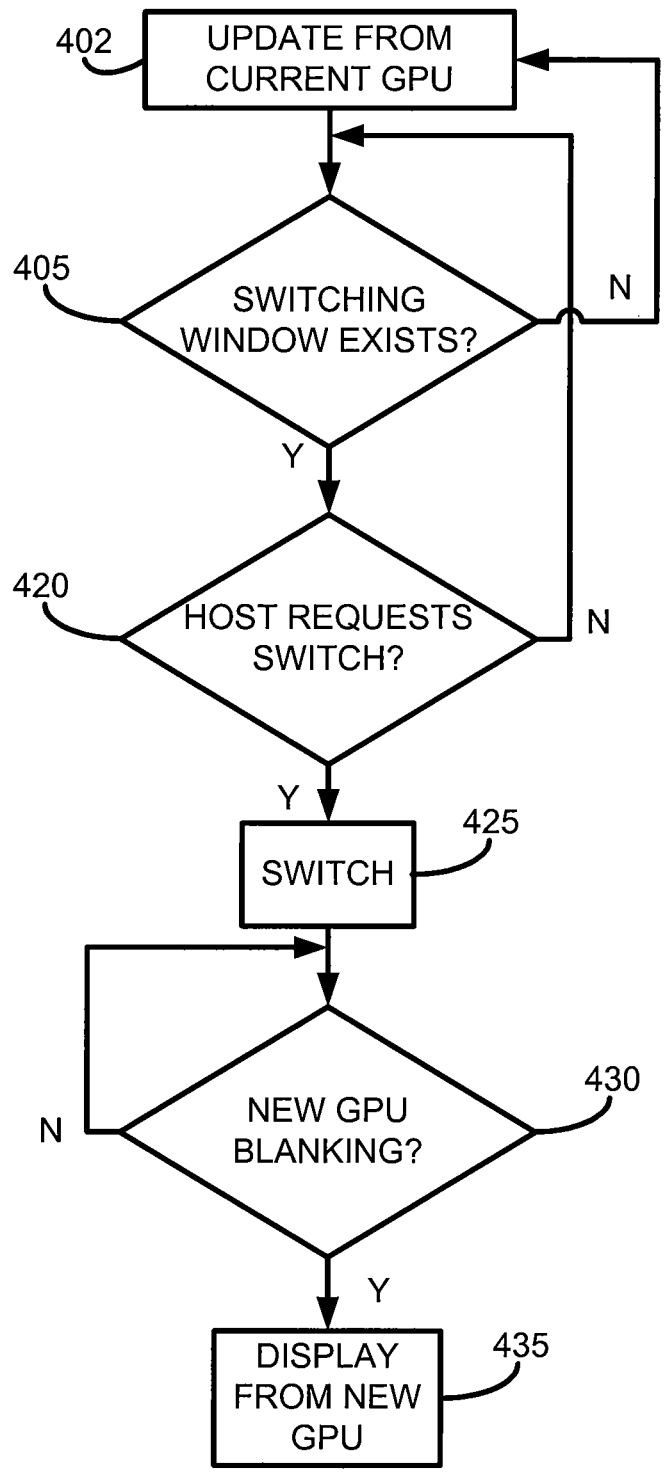
FIG. 4 illustrates exemplary GPU switching operations.

FIG. 4 illustrates exemplary operations that may be performed by the display system 100 during a GPU switch. In block 402, the operations may begin with the display 130 being updated from a current GPU. Next, in block 405, the T-CON 125 may determine that a switching window exists. If a switching window does not exist, then control may flow back to block 402 where the display 130 is updated from the current GPU. In some embodiments, the T-CON 125 may determine in the current GPU blanking that a switching window exists.

Referring again to FIG. 4, in the event that the T-CON 125 does detect that a switching window exists, control may flow to block 420, where the T-CON 125 may wait for the host computer 105 to request a GPU switch. As mentioned above, the GPU switch request may occur because the host computer 105 is consuming too much power or because the host computer 105 needs greater graphics processing abilities.

After the T-CON 125 indicates that a switching window exists, the T-CON 125 may enter an "expecting switch" mode and hold the present screen. For example, in one embodiment, the T-CON 125 may repaint the display 130 with an image from a frame buffer (not specifically shown in FIG. 1) repetitively until the T-CON 125 completes the GPU switch. This may reduce the overall number of visual artifacts resulting from a GPU switch.

Referring still to FIG. 4, as shown in block 420, in the event that the host computer 105 has yet to request a GPU switch, control may flow back to block 405, where it is determined whether a switching window exists. If, however, the host computer 105 has requested the GPU switch while the switching window exists, then the switch may be performed as shown in block 425.

Once the T-CON 125 has switched GPUs, it may wait until it sees a blanking interval in the new video data before it stops repainting the display 130 with the old image from the frame buffer and begins painting the image from the new GPU. As shown in block 430, the T-CON 125 may wait until the new GPU enters a blanking period before it begins painting the display 130 from the new GPU (as shown in block 435). In this manner, control may flow back to the block 430 while the T-CON 125 waits for the new GPU to enter a blanking period.

Figure 5:
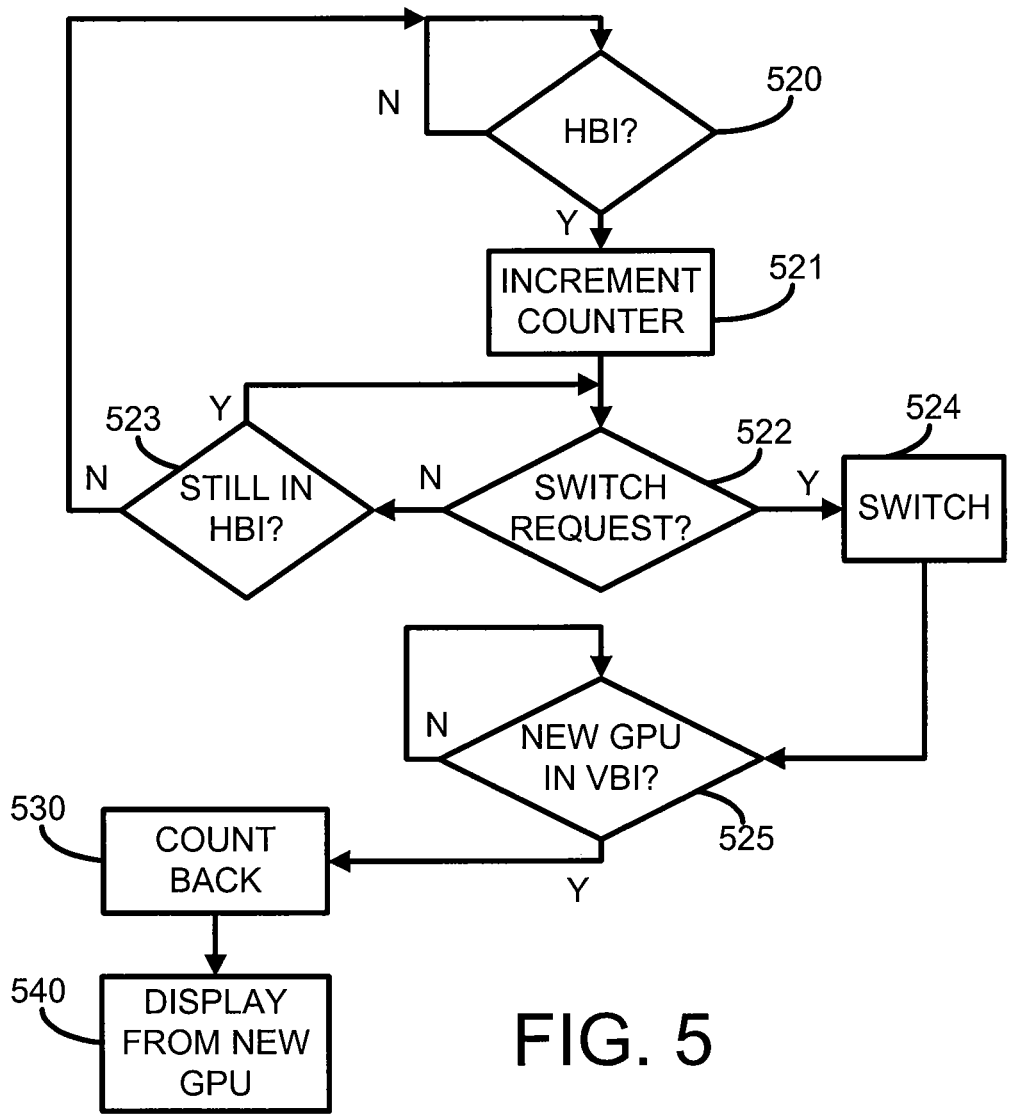
FIG. 5 illustrates exemplary GPU switching operations during a horizontal blanking interval.

As mentioned previously, the GPU switch may occur during the VBI or HBI. FIG. 5 illustrates exemplary operations for performing the GPU switch during the HBI. Frames of video data may be painted on the display at a predetermined rate—e.g., 60 times per second—where a VBI may be present between successive frames. Each frame also may include a plurality of scan lines of video data in pixel form where an HBI may be present between successive scan lines. In block 520, the T-CON 125 may determine whether the current GPU is undergoing an HBI. For example, the T-CON 125 may operate on the display system's 100 timing signal (not specifically shown in the figures) and note when a predetermined number of pixels representing a scan line have been painted on the display 130 and the current GPU is in an HBI.

Switching between GPUs during an HBI may be more complicated than switching during a VBI because of synchronization of the new GPU with the correct scan line. For example, if the GPU switch occurs after the current GPU paints display scan line n, then the new GPU may need to start updating the display 130 at the beginning of the display scan line n+1. In this manner, the new GPU may need to count back the number of scan lines that have transpired since the GPU switch. Thus, if the current GPU is undergoing an HBI then a counter 510 within the T-CON 125 (shown in FIG. 1) may be incremented per block 521 to note the overall number of HBIs that have occurred since the switch to the current GPU.

Next, the T-CON 125 may determine if a switch request has occurred in block 522. As shown in FIG. 1, this switch request may come from the host computer 105, although other embodiments are possible where the switch request originates from another block within the system 100. In the event that a switch request has yet to occur, then the T-CON 125 may determine if the current GPU is still undergoing an HBI per block 523. If the current GPU is still undergoing an HBI, then control may loop back to block 522 to again determine if a switch request has occurred. If the current GPU is not still undergoing an HBI, then control may loop back to block 520, where the T-CON 125 may monitor for the condition where the current GPU enters HBI.

Referring still to block 522, in the event that a switch request has occurred, then a glitch-free GPU switch may be performed per block 524. If the new GPU has not yet reached VBI, the control may flow back to block 525 until the new GPU enters VBI. On the other hand, when the new GPU enters VBI, then the value in counter 510 may be read and used to count back the number of scan lines from the VBI for the new GPU to synchronize per block 530. As shown, control may loop back to block 525 until the new GPU is in VBI. In other words, the value in counter 510 may be used as an offset from the VBI to determine the location in the frame of video data from which the new GPU should start painting data so that a glitch free switch occurs on the display 130. After this synchronization, the T-CON 125 may use the new GPU to drive the display 130.

What is claimed is:

1. A system, comprising:
   a timing controller including a plurality of receivers; and
   a plurality of Graphics Processing Units (GPUs), wherein
      each receiver is configured to receive video image and frame data from a corresponding one or more of the GPUs; and
   wherein the timing controller is configured to:
      provide to the display a video output signal that is dependent upon the video image and frame data from a first of the GPUs; and
      switch, upon an occurrence of a vertical blanking interval, to provide to the display a video output signal that is dependent upon the video image and frame data from a second of the GPUs;
   wherein the timing controller is further configured to switch to provide to the display a video output signal that is dependent upon the video image and frame data from the second GPU upon an occurrence of a vertical blanking interval of the video image and frame data of the second GPU.

2. The system of claim 1, wherein the second GPU is configured to be powered off prior to the timing controller switching to provide to the display the video output signal that is dependent upon the video image and frame data from the second GPU.

3. The system of claim 1, wherein at least one of the plurality of receivers is coupled directly to at least one of the GPUs without an intermediate multiplexer.

4. The system of claim 1, wherein the timing controller further comprises a counter.

5. The system of claim 4, wherein a value in the counter is used to determine a display location within the display.

6. The system of claim 1, wherein the timing controller is further configured to switch to provide to the display a video output signal that is dependent upon the video image and frame data from the second GPU after a request from another component within the system.

7. The system of claim 1, wherein each receiver comprises a phased locked loop (PLL).

8. The system of claim 7, wherein the PLL extracts a timing signal from a signal from second GPU.

9. A method of switching between Graphics Processing Units (GPUs) in a display system, the method comprising:
receiving, by one or more receivers of a timing controller, video image and frame data from a corresponding one or more GPUs of the display system;
updating, by the timing controller, a display based upon the video image and frame data from a first GPU;
determining, by the timing controller, if the first GPU has entered a vertical blanking interval;
in the event that the first GPU has entered a vertical blanking interval, determining, by the timing controller, if another component within the display system has requested a GPU switch;
in the event that the another component within the display system has requested a GPU switch, switching, by the timing controller, to updating the display based upon the video image and frame data from a second GPU;
wherein switching to updating the display from the video image and frame data from the second GPU occurs while the video image and frame data from the second GPU is in a vertical blanking period.

10. The method of claim 9, wherein switching to updating the display from the video image and frame data from the second GPU occurs without phase locking to a timing signal from the second GPU.

11. The method of claim 9, wherein the first GPU is part of a chipset and the second GPU is not part of the chipset.

12. The method of claim 9, wherein the vertical blanking periods of the first and second GPUs overlap during switching.

13. The method of claim 9, further comprising updating a counter in the timing controller.

14. The method of claim 13, wherein a value in the counter is used to calculate a starting point for the second GPU to begin painting video data on the display.

15. The method of claim 9, wherein the first GPU is connected directly to a first receiver within the timing controller and the second GPU is connected directly to a second receiver within the timing controller and each receiver comprises a phased locked loop (PLL).

16. A timing controller, comprising:
a plurality of receivers, each receiver configured to receive video image and frame data from a corresponding one or more graphics processing units (GPUs), wherein:
each receiver comprises a phased locked loop (PLL); and
the timing controller is configured to:
provide to display a video output signal that is dependent upon the video image and frame data from a first of the GPUs; and
switch, upon an occurrence of a vertical blanking interval, to provide to the display a video output signal that is dependent upon the video image and frame data from a second of the GPUs;
wherein the timing controller is further configured to switch to provide to the display a video output signal that is dependent upon the video image and frame data from the second of the GPUs upon an occurrence of a vertical blanking interval of the video image and frame data of the second of the GPUs.

17. The timing controller of claim 16, wherein at least one of the GPUs in the plurality is powered off.

18. The system of claim 16, wherein the timing controller further comprises a counter and a value in the counter is used to determine a display location within the display for the second GPU.

* * * * *